United States Patent
Asakawa et al.

(10) Patent No.: US 7,146,958 B2
(45) Date of Patent: Dec. 12, 2006

(54) CONTROL APPARATUS FOR HYBRID VEHICLE

(75) Inventors: Masanobu Asakawa, Utsunomiya (JP); Manabu Niki, Utsunomiya (JP); Kohei Hanada, Utsunomiya (JP); Minoru Suzuki, Shimotsuga-gun (JP); Teruo Wakashiro, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 10/880,458

(22) Filed: Jul. 1, 2004

(65) Prior Publication Data

US 2005/0000481 A1    Jan. 6, 2005

(30) Foreign Application Priority Data

Jul. 4, 2003    (JP)    .............................. 2003-192311

(51) Int. Cl.
  F02D 41/06    (2006.01)
  B60K 6/02    (2006.01)

(52) U.S. Cl. ............................... 123/179.16; 180/65.2; 123/325

(58) Field of Classification Search ........... 123/179.16, 123/325, 332, 333; 180/65.2; 701/113, 701/114
  See application file for complete search history.

(56) References Cited

U.S. PATENT DOCUMENTS

| | | | | |
|---|---|---|---|---|
| 5,979,158 A * | 11/1999 | Kaiser et al. | .................. | 60/274 |
| 6,334,834 B1 * | 1/2002 | Mizutani et al. | ............. | 477/203 |
| 6,352,489 B1 * | 3/2002 | Kuroda et al. | .................. | 477/5 |
| 6,434,453 B1 * | 8/2002 | Kuroda et al. | ................. | 701/22 |
| 6,442,455 B1 * | 8/2002 | Kotre et al. | ................... | 701/22 |
| 6,443,126 B1 * | 9/2002 | Morimoto et al. | ..... | 123/339.15 |
| 6,621,175 B1 * | 9/2003 | Kuroda et al. | ............ | 290/40 D |
| 6,622,804 B1 * | 9/2003 | Schmitz et al. | ............. | 180/65.2 |
| 6,640,763 B1 * | 11/2003 | Kawakami et al. | ...... | 123/179.3 |
| 6,763,903 B1 * | 7/2004 | Morimoto et al. | ......... | 180/65.2 |
| 6,772,723 B1 * | 8/2004 | Aoki et al. | ............... | 123/179.4 |
| 6,868,926 B1 * | 3/2005 | Boggs et al. | ............... | 180/65.2 |
| 6,941,198 B1 * | 9/2005 | Brigham et al. | ............... | 701/22 |
| 2002/0116113 A1 * | 8/2002 | Kaneko | ....................... | 701/112 |
| 2003/0183430 A1 * | 10/2003 | Naito et al. | ................. | 180/65.2 |
| 2004/0026928 A1 * | 2/2004 | Wakashiro et al. | ........ | 290/40 C |
| 2004/0045751 A1 * | 3/2004 | Aoki et al. | ................. | 180/65.2 |
| 2005/0000481 A1 * | 1/2005 | Asakawa et al. | ...... | 123/179.16 |

FOREIGN PATENT DOCUMENTS

| JP | A-H09-163509 | 6/1997 |
|---|---|---|
| JP | 2000-50412 A | 2/2000 |

* cited by examiner

*Primary Examiner*—Henry C. Yuen
*Assistant Examiner*—Arnold Castro
(74) *Attorney, Agent, or Firm*—Arent Fox PLLC

(57) ABSTRACT

An object is to improve fuel consumption efficiency. Accordingly, a fuel gradual addition delay time when starting (engine water temperature) TMKSTDLYT which changes in a decreasing trend with an increase in the engine water temperature is set (step S10). A fuel gradual addition delay time when starting (state of charge)TMKSTDLYQ which changes in an increasing trend with an increase in the state of charge QBAT is set (step S12 and S14). A fuel gradual addition delay time when starting (vehicle speed) TMKSTDLYV which changes in a decreasing trend with an increase in vehicle speed VP is set (step S13 and S15). Then the greatest value of; the fuel gradual addition delay time when starting (engine water temperature)TMKSTDLYT, the fuel gradual addition delay time when starting (state of charge)TMKSTDLYQ, and the fuel gradual addition delay time when starting (vehicle speed) TMKSTDLYV is set as a fuel gradual addition delay time when starting TMKSTDLY (step S16).

5 Claims, 7 Drawing Sheets

CONTROL APPARATUS FOR HYBRID VEHICLE

BACKGROUND OF THE INVENTION

1. Field of the Invention

The present invention relates to a control apparatus for a hybrid vehicle which is mounted in a hybrid vehicle propulsion driven by jointly using an internal-combustion engine and a motor, and wherein the driving force from at least one of the internal-combustion engine and the motor is transmitted to the driving wheels.

2. Description of Related Art

Conventionally, for example, in a hybrid vehicle which comprises an internal-combustion engine and a motor as a power source and wherein the driving force from at least one of the internal-combustion engine and the motor is transmitted to the driving wheels for propulsion, a control apparatus for a hybrid vehicle has been well known which calculates the throttle opening for minimizing the fuel consumption of the internal-combustion engine with respect to the rotating speed of the input shaft of the transmission, and based on this throttle opening and the accelerator operation amount of a driver, allocates the torque required by the power plant (that is, the internal-combustion engine and the motor), to the engine torque required by the internal-combustion engine and to the motor torque required by the motor (for example, refer to Japanese Patent Application Unexamined Publication No. Hei 9-163509.

Incidentally, in a control apparatus for a hybrid vehicle according to an example of the above conventional technique, there is concern that for example, if the timing to start the fuel supply to the internal-combustion engine after completion of a predetermined warming-up operation is set to a predetermined timing according to the engine speed and the engine water temperature (temperature of the cooling water of the internal-combustion engine) regardless of the starting state of the internal-combustion engine, for example normal start of the internal-combustion engine, or restart of the internal-combustion engine where fuel supply is restarted from a temporary fuel supply canceling state, the fuel consumption efficiency may be deteriorated.

For example, in a hybrid vehicle comprising a torque converter equipped with a lock-up clutch wherein the output from one of the internal-combustion engine and the motor is transferred to the transmission through this torque converter, if the setting is such that the fuel supply is started after a predetermined time according to the engine water temperature, has passed from the point in time when it is determined that the engine speed of the internal-combustion engine driven by the motor is greater than a predetermined speed, there may be a problem in that for example, in an operating state where the vehicle is repeatedly made to start and stop frequently, for example such as in a traffic jam, then even in the case where creep travel (travel by means of a creep force) by the driving force of the motor is desired, the internal-combustion engine is restarted with excessive frequency.

SUMMARY OF THE INVENTION

The present invention takes the above situation into consideration, with an object of providing a control apparatus for a hybrid vehicle in which fuel consumption efficiency can be improved.

In order to solve the above problem and achieve the related object, according to the present invention, there is provided a control apparatus for a hybrid vehicle which includes an internal-combustion engine and a motor as a power source, and a power storage unit which transfers electric energy between it and the motor (for example, the battery 3 in the embodiment), and connects at least one of the internal-combustion engine and the motor to driving wheels of the vehicle through a transmission so as to transmit a driving force to the driving wheels, comprising: a fuel supply canceling device (for example the FI/AT/MGECU 36 in the embodiment) which automatically cancels fuel supply to the internal-combustion engine according to an operating state of the vehicle; a starting state determining device (for example, step S11 in the embodiment) which determines, when starting the internal-combustion engine, whether or not it is restart of the internal-combustion engine in which fuel supply is restarted from a fuel supply canceling state by the fuel supply canceling device; and a fuel supply start timing setting device (for example, step S10, and step S112 to step S16 in the embodiment) which sets a timing to start fuel supply to the internal-combustion engine based on a determination by the starting state determining device, a traveling state of the vehicle, and a state of charge of the power storage unit.

According to the control apparatus for a hybrid vehicle of the above construction, by setting the timing to start the fuel supply based on the travelling state of the vehicle such as the vehicle speed, and the state of charge of the power storage unit, at the time of restarting the internal-combustion engine when fuel supply is restarted from an execution state of fuel cut where the fuel supply to the internal-combustion engine is temporarily canceled, it is possible to keep fuel supply from being restarted with excessive frequency by delaying the timing to start the fuel supply in the case where the vehicle can be driven to travel under the driving force of the motor, and it becomes possible to improve the fuel consumption efficiency while maintaining the desired driving force, even in the case where the vehicle is repeatedly made to travel and stop for example in a traffic jam.

Preferably, in the control apparatus for a hybrid vehicle of the above construction, the fuel supply start timing setting device sets the timing to start fuel supply to the internal-combustion engine based on an engine water temperature, the determination by the starting state determining device, the state of charge of the power storage unit, and a vehicle speed.

Preferably, in the above control apparatus for a hybrid vehicle, fuel supply delay times are set based respectively on the engine water temperature, the state of charge of the power storage unit, and the vehicle speed, and the greatest value of the fuel supply delay times is set as the timing to start fuel supply to the internal-combustion engine.

Preferably, the above control apparatus for a hybrid vehicle further comprises tables of fuel supply delay times based respectively on the engine water temperature, the state of charge of the power storage unit, and the vehicle speed, and the tables of fuel supply delay times are retrieved to set the fuel supply delay times based on the engine water temperature, the state of charge of the power storage unit, and the vehicle speed.

Preferably, in the above control apparatus for a hybrid vehicle, different tables of fuel supply delay times are used for setting the fuel supply delay times based on the state of charge of the power storage unit, and the vehicle speed, depending on the determination by the starting state determining device.

DETAILED DESCRIPTION OF THE INVENTION

Hereunder is a description of a control apparatus for a hybrid vehicle according to an embodiment of the present invention with reference to the appended drawings.

Figure 1:
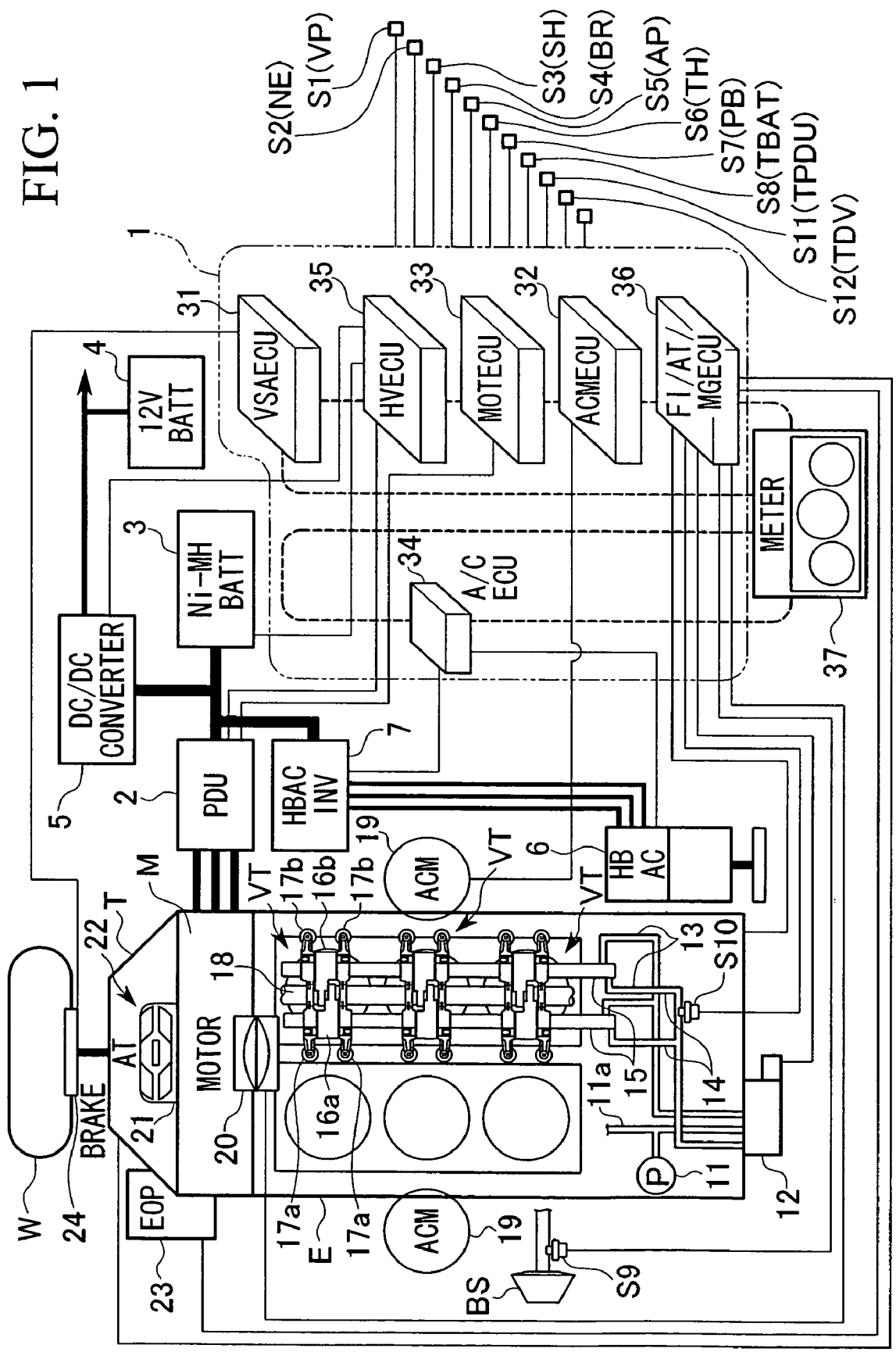
FIG. 1 shows a construction of a control apparatus for a hybrid vehicle according to an embodiment of the present invention.

FIG. 1 shows a parallel hybrid vehicle according to the embodiment of this invention having a construction where an internal-combustion engine E, a motor M, and a transmission T are connected directly in series. The driving force of both the internal-combustion engine E and the motor M is transmitted, for example, from the transmission T such as an automatic transmission (AT) or manual transmission (MT),) to the driving wheels W of the vehicle, via a differential gear (not shown) which distributes the driving force between driving wheels W on the right and the left (front wheels or rear wheels. Moreover, when a driving force is transmitted from the driving wheel W side to the motor M side at the time of deceleration of the hybrid vehicle, the motor M functions as a generator to generate so-called regenerative braking, and the kinetic energy of the vehicle body is recovered as electrical energy.

The motor M, being for example a three-phase brushless DC motor or the like, is connected to a power drive unit (PDU) 2. The power drive unit 2 comprises, for example a PWM inverter involving pulse width modulation (PWM), installed with a bridge circuit being a bridge connected using a plurality of transistor switching elements, and is connected to a nickel-hydrogen battery (battery) 3 of a high voltage system which transfers the power for the motor M (the power supply which is supplied to the motor M during the power running operation (driving or assisting) of the motor M, or the regenerated power which is output from the motor M during the regenerative operation).

Moreover, the drive and regenerative operation are performed by the power drive unit 2 receiving control instructions from a control unit 1. That is, for example when driving the motor M, based on torque instructions input from the control unit 1, the power drive unit 2 converts the DC power output from the battery 3 into three-phase AC power and supplies this to the motor M. On the other hand, during the regenerative operation of the motor M, the three-phase AC power output from the motor M is converted into the DC power and the battery 3 is charged.

Furthermore, an auxiliary battery 4 of 12 volts for driving various accessories, is connected to the power drive unit 2 and the battery 3 in parallel via a downverter 5 which is a DC-DC converter. The downverter 5 is controlled by the control unit 1 and charges the auxiliary battery 4 by lowering the voltage of the power drive unit 2 or the battery 3.

Moreover, a crankshaft of the internal-combustion engine E is connected, for example through a belt or a clutch to a rotation shaft of an air conditioning motor (not shown) equipped in a hybrid air conditioning compressor (HBAC) 6. This air conditioning motor is connected to an air conditioning inverter (HBAC INV) 7. The air conditioning inverter 7 is connected in parallel to the power drive unit 2 and the battery 3, and under the control of the control unit 1, converts the DC power output from the power drive unit 2 and the battery 3 into three-phase AC power to supply to the air conditioning motor so as to drive control the hybrid air conditioning compressor 6.

That is, in the hybrid air conditioning compressor 6, the driving load, for example the discharge of the refrigerant, is variably controlled under the driving force from at least one of the internal-combustion engine E and the air conditioning motor during the power running operation of the air conditioning motor. Here, "hybrid" in the hybrid air conditioning compressor 6 means that it can be driven by either one of the internal-combustion engine E and the motor M.

Between the internal-combustion engine E and the air conditioning motor, there are for example, a crankshaft pulley integrally provided with the crankshaft of the internal-combustion engine E, a driving shaft pulley paired with the crankshaft pulley and integrally provided with a driving shaft connectable with the rotation shaft of the air conditioning motor through a clutch, and a belt spanning between the crankshaft pulley and the driving shaft pulley. That is, between the crankshaft pulley and the driving shaft pulley, the driving force is transmitted through the belt.

Moreover, the internal-combustion engine E is a so-called SOHC V6 cylinder engine, of a construction having three cylinders on one bank comprising a variable valve timing mechanism VT enabling a cylinder deactivation operation, and a construction having three cylinders on the other bank comprising a normal valve operating mechanism (not shown) which does not perform the cylinder deactivation operation. Furthermore, the three cylinders enabling the cylinder deactivation operation have a construction such that respective two inlet valves and two exhaust valves are able to maintain the closed state by means of the variable timing mechanism VT, via an oil pressure pump 11, a spool valve 12, a cylinder deactivation side path 13, and a cylinder deactivation cancellation side path 14.

That is, the internal-combustion engine E may be switched between three cylinders operation (cylinder deactivation operation) in the state such that the three cylinders on one side bank are deactivated, and six cylinders operation (all cylinders operation) such that all six cylinders on both side banks are driven.

Specifically, if operating oil being supplied from the oil pressure pump 11 through the lubrication system piping 11a to the engine lubrication system is partially supplied via the spool valve 12 comprising a solenoid controlled by the control unit 1, to the cylinder deactivation side path 13 on the bank capable of cylinder deactivation operation, a cam lift rocker arm 16a (16b) and valve drive rocker arms 17a (17b) which are supported on the respective rocker shafts 15 and were integrally driven, are able to be driven separately. Therefore, the driving forces of the cam lift rocker arms 16a and 16b driven by the rotation of the cam shaft 18 are not transmitted to the valve drive rocker arms 17a and 17b, so that the inlet valves and the exhaust valves remain in the closed state. Accordingly the cylinder deactivation operation where the inlet valves and the exhaust valves of the three cylinders become in the closed state may be performed.

The internal-combustion engine E is mounted via a damping device (ACM: Active Control Engine Mount) 19 onto the vehicle so that the damping device 19 can suppress the generation of vehicle vibration accompanied with the operating state of the internal-combustion engine E, that is the switching of the three cylinders operation (cylinder deactivation operation) and the six cylinders operation (all cylinders operation).

Moreover, this internal-combustion engine E comprises an electronic throttle control system (ETCS) 20 which electronically controls a throttle valve (not shown).

The ETCS 20 drives an ETCS driver according to the throttle opening calculated in the control unit 1 based for example on the accelerator pedal opening related to the operating amount of the accelerator pedal (not shown) by a driver, the operating state of the vehicle such as the vehicle travelling speed (vehicle speed) VP or the engine speed NE, and on the torque distribution between the internal-combustion engine E and the motor M, so as to directly control the throttle valve.

For example the transmission T being the automatic transmission (AT) is constructed to comprise a torque converter 22 equipped with a lock-up clutch (LC) 21, and an electric oil pump 23 which generates the oil pressure for drive controlling the torque converter 22 and for the shifting operation of the transmission T.

The electric oil pump 23 is drive controlled by the control unit 1 with the power supply from the battery 3.

The torque converter 22 transmits the torque by a spiral flow of the operating oil (ATF: Automatic Transmission Fluid) enclosed inside. In an LC_OFF state where the engagement of the lock-up clutch 21 is cancelled, the torque is transmitted (for example, amplification transmission) from the rotation shaft of the motor M to the input shaft of the transmission T via the operating oil.

Furthermore, in an LC_ON state where the lock-up clutch 21 is set up in the engagement state, the rotation driving force is directly transmitted from the rotation shaft of the motor M to the input shaft of the transmission T and not via the operating oil.

Moreover, a booster BS is linked to the brake pedal (not shown). A master power internal negative pressure sensor S9 which detects the brake master power internal negative pressure is provided in the booster BS.

Moreover, the driving wheel W comprises a brake device 24. The brake device 24 suppresses the generation of rapid behavioral change of the vehicle by control of the control unit 1. For example, it prevents slipping of the driving wheel W on a slippery road surface or the like, suppresses side slip such as oversteering or understeering, prevents the driving wheel W from being in a locked state during braking, ensures the desired driving force and the steering performance of the vehicle, stabilizes the posture of the vehicle, and assists with travelling by means of a creep force, for example, prevents the vehicle from moving backward on a slope when deactivating the internal-combustion engine E.

Inputs to the control unit 1 are: for example: a detection signal from a vehicle speed sensor S1 which detects the travelling speed of the vehicle VP, a detection signal from an engine speed sensor S2 which detects the engine speed NE, a detection signal from a shift position sensor S3 which detects the shift position SH of the transmission T, a detection signal from a brake switch S4 which detects the operating state BR of the brake (Br) pedal, a detection signal from an accelerator pedal opening sensor S5 which detects the accelerator pedal opening AP according to the operation amount of the accelerator pedal, a detection signal from a throttle opening sensor S6 which detects the throttle opening TH, a detection signal from an intake pipe pressure sensor S7 which detects the intake pipe pressure PB, a detection signal from a battery temperature sensor S8 which detects the temperature TBAT of the battery 3, a detection signal from the master power internal negative pressure sensor S9, a detection signal from a POIL sensor S110 which detects the oil pressure of the cylinder deactivation cancellation side path 14 when deactivating the cylinders, a detection signal from a PDU temperature sensor S11 which detects the temperature TPDU of the power drive unit 2, and a detection signal from a DV temperature sensor S12 which detects the temperature TDV of the downverter 5.

Moreover, the control unit 1 comprises: for example: a VSA (Vehicle Stability Assist) ECU 31 which drive controls the brake device 24 to stabilize the behavior of the vehicle, an ACMECU 32 which drive controls the damping device 19 to suppress the generation of car body vibration caused by the operating state of the internal-combustion engine E, a MOTECU 33 which controls the driving and the regenerative operation of the motor M, an A/CECU 34 which drive controls the air conditioning hybrid air conditioning compressor 6 and the air conditioning inverter 7, and an HVECU 35 which monitors and protects the high voltage electrical equipment system comprising for example the power drive unit 2, the battery 3, the downverter 5, and the motor M, and controls the operation of the power drive unit 2 and the downverter 5, and a FI/AT/MGECU 36. The respective VSAECU 31 to 36 are mutually connected communicably. The respective ECUs 31 to 36 are connected to a meter 37 comprising instruments which display the amount of the respective types of states.

Figure 2:
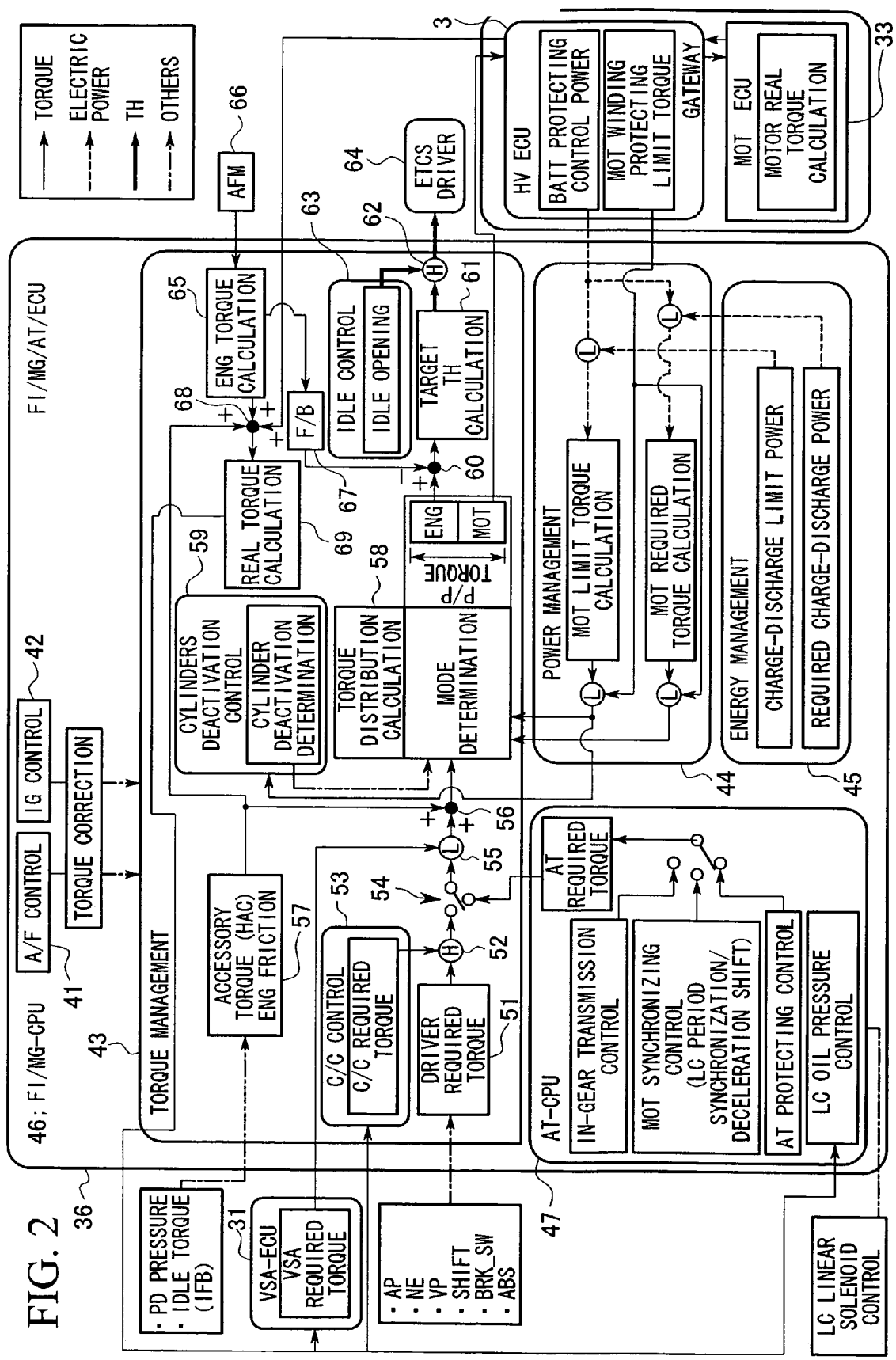
FIG. 2 is a block diagram of the control unit shown in FIG. 1.

For example, as shown in FIG. 2, the FI/AT/MGECU 36 comprises; a FI/MG-CPU 46 installed with an A/F (air/fuel ratio) control unit 41 and an IG (ignition) control unit 42 which control the fuel supply to and the ignition timing of the internal-combustion engine E, a torque management section 43, a power management section 44, and an energy management section 45; and for example an AT-CPU 47 which controls the shifting operation of the transmission T, the operating state of the lock-up clutch 2, and the like.

In the torque management section 43, a driver required torque calculating section 51 calculates the torque value required by a driver of the vehicle (driver required torque) depending on the operation amount of the accelerator by the driver, for example based on respective detection signals from the accelerator pedal (AP) opening, the engine speed NE, the vehicle travelling speed VP, the shift position SH, the operating state of a brake pedal BRK_SW, and the operating state ABS of an antilock brake system which prevents the driving wheels W from being locked during vehicle braking by the brake device 24, and outputs this torque value to a first torque selecting section 52.

Moreover, a C/C (cruise control) unit 53 calculates the torque value (C/C required torque) targeted during the travel control satisfying predetermined traveling conditions previously set according to the input operation of the driver, that is cruise control, for example, such as the constant speed travelling control which controls the internal-combustion engine E and the motor M so that the vehicle travelling speed VP detected in a vehicle speed sensor S1 becomes the target vehicle speed which is the target value of the travelling speed of the vehicle, and follow travel control for following a preceding vehicle while maintaining a predetermined vehicular gap, and outputs the torque value to the first torque selecting section 52.

The first torque selecting section 52 selects the greater torque value of the driver required torque or the C/C required torque, and outputs to the torque switching section 54. Therefore, for example even during cruise control, in the case where the driver required value according to the accelerator operation of the driver of the vehicle is over the C/C required torque, the torque according to the driver required value is output.

The torque switching section 54 selects either one of the torque value input from the first torque selecting section 52 and the AT required value input from the AT-CPU 47, and outputs to a second torque selecting section 55.

The AT-CPU 47 selects either one of the torque values as the AT required torque among, for example; a torque value set during the shifting operation of the transmission T, a torque value targeted when performing synchronizing control which synchronize the period of the input shaft of the transmission T and the rotating speed of the motor M during driving the lock-up clutch 21 or shifting the speed such as shifting down, and a torque value set during protection control of the transmission T in the case where a driver operates the accelerator pedal and the brake pedal at the same time.

Moreover, the AT-CPU 47 electronically controls the oil pressure which drives the lock-up clutch 21 by an LC linear solenoid, and it is possible to set the operation, in addition to the LC_ON state where the lock-up clutch 21 is in the engagement state and the LC_OFF state where the engagement is cancelled, to an intermediate state which generates an appropriate smoothness in the lock-up clutch 21.

The second torque selecting section 55 selects the smaller torque value of the torque value input from the torque switching section 54 and the VSA required torque input from the VSAECU 31, then sets this torque value as a torque of the crankshaft (crankshaft torque), that is the target torque value with respect to the actual rotation of the driving wheels W, and outputs to a first adding section 56.

Moreover, an auxiliary torque-ENG friction calculating section 57 calculates, for example the auxiliary torque (HAC) required for driving the accessories based on the protrusive pressure (PD) of the air conditioner, calculates the torque value in relation to the engine (ENG) friction of the internal-combustion engine E based on the increased amount of the engine friction in a low temperature state compared to a standard for the engine friction value after termination of warming up of the internal-combustion engine E, and outputs to the first adding section 56.

The first adding section 56 sets the value obtained by adding the crank terminal torque and the torque value input from the auxiliary torque-ENG friction calculating section 57, as the power plant (P/P) torque which is the target torque with respect to the torque output from the power plant (that is, the internal-combustion engine E and the motor M), and outputs to a torque distribution calculating section 58.

The torque distribution calculating section 58 selects the required torque mode for instructing the predetermined operating state of the internal-combustion engine E and the motor M based on the cylinder deactivation determination output from the cylinder deactivation control unit 59 for determining whether the cylinder deactivation operation of the internal-combustion engine E should be executed or not, and the limit torque and the required torque with respect to the motor M output from the power management section 44, and according to the selection result, sets the distribution of the power plant torque (P/P) with respect to the respective torque instructions of the internal-combustion engine E and the motor M.

To the cylinder deactivation control unit 59 is input the limit torque for the motor M output from the power management section 44 described later, and according to the limit torque for the motor M, the cylinder deactivation control unit 59 determines whether the cylinder deactivation operation should be executed or not.

The power management section 44 calculates, for example the motor (MOT) limit torque based on the smaller power of the battery (BATT) protecting limit power output from the HVECU 35 and the charge-discharge limit power output from the energy management section 45, then sets the smaller one of the calculated-motor limit torque and the motor (MOT) winding protecting limit torque output from the HVECU 35 as the limit torque, and outputs to the torque distribution calculating section 58 and the cylinder deactivation control unit 59.

Moreover, the power management section 44 calculates, for example the motor (MOT) limit torque based on the smaller power of the battery (BATT) protecting limit power output from the HVECU 35 and the required charge-discharge power output from the energy management section 45, then sets the smaller one of the calculated motor limit torque and the motor (MOT) winding protecting limit torque output from the HVECU 35 as the required torque, and outputs to the torque distribution calculating section 58.

The charge-discharge limit power and the required charge-discharge power output from the energy management section 45 are, for example the limited amount and the required amount with respect to charge and discharge set according to the state of charge of the battery 3 and the auxiliary battery 4.

Moreover, the battery (BATT) protecting limit power output from the HVECU 35 is, for example the limit value of the output power of the battery 3 set according to the temperature state of the battery 3, the auxiliary battery 4, and the other high voltage electrical equipment. The motor (MOT) winding protecting limit torque is the limit value of the output torque of the motor M set according to the temperature state of the motor M.

The torque instruction of the internal-combustion engine E calculated by the torque distribution calculating section 58 is input into a subtracting section 60. The subtracting section 60 inputs the value obtained by subtracting the torque value input from the feedback (F/B) processing section 67 described later from the torque instruction of the internal-combustion engine E, to a target TH calculating section 61. The target TH calculating section 61 calculates the target value for the electronic throttle opening TH in relation to the drive of the ETCS driver based on the input torque value, and outputs to a third torque selecting section 62.

The third torque selecting section 62 selects the greater throttle opening value of the target value of the electronic throttle opening TH input from the target-TH and the idle opening output from the idle control unit 63, and outputs this throttle opening value to the ETCS driver 64.

The idle opening output from the idle control unit 63 is, for example, a limit value with respect to the throttle opening TH for preventing the engine speed NE from being less than the predetermined rotating speed during the idle operation of the internal-combustion engine E.

Moreover, to the ENG torque calculating section 65 in the torque management section 43 is input a detection signal intake air amount (or supplied oxygen amount) of the internal-combustion engine E detected by an airflow meter (AFM) 66. The ENG torque calculating section 65 calculates the ENG torque output from the internal-combustion engine E based on the detection value of the intake air amount, and outputs to the feed back (F/B) processing section 67 and a second adding section 68.

The feed back (F/B) processing section 67, with respect to the torque instruction of the internal-combustion engine E calculated in the torque distribution calculating section 58, corrects for calculation errors of ENG torque based for example on the detection value of the airflow meter 66, response characteristic or aged deterioration of the internal-combustion engine E, performance irregularities during mass production of the internal-combustion engine E and the like, by feed back processing, and inputs the ENG torque calculated in the ENG torque calculating section 65 to the subtracting section 60.

A third adding section 68 inputs the torque value obtained by adding; the ENG torque calculated in the ENG torque calculating section 65, the torque value input from the auxiliary torque-ENG friction calculating section 57, and the motor real torque input from the MOTECU 33, to the real torque calculating section 69. The real torque calculating section 69 calculates the real torque value which is actually output from the power plant (that is, the internal-combustion engine E and the motor M) based on the input torque value.

To the MOTECU 33 is input the torque instruction of the motor M calculated by the torque distribution calculating section 58 in the torque management section 43, via the HVECU 35. The MOTECU-33 calculates the motor real torque which is actually output from the motor M based on the input torque value, and inputs to the third adding section 68 in the torque management section 43, via the HVECU 35.

Moreover, the real torque value calculated in the real torque calculating section 69 is input to the AT-CPU 47, and based on this real torque value, the oil pressure which drives the lock-up clutch 21 is electronically controlled by an LC linear solenoid.

The respective torque values calculated in the torque management section 43 are corrected according to the ignition timing, the air/fuel ratio, and the presence/absence of the fuel cut (fuel supply cancellation) of the internal-combustion engine E which are controlled in the A/F (air/fuel ratio) control unit 41 and the IG (ignition) control unit 42.

The control apparatus for a hybrid vehicle according to the present embodiment comprises the above construction. Next is a description of an operation of this control apparatus for a hybrid vehicle, particularly, a processing which controls the fuel supply state when starting the internal-combustion engine E.

The FI/AT/MGECU 36, for example, when restarting the internal-combustion engine which shifts from the fuel cut (F/C) executing time where the fuel supply to the internal-combustion engine is temporarily cancelled, to the F/C resetting time where the fuel supply is restarted, firstly increase the engine speed NE of the internal-combustion engine E by the driving force of the motor M. Then, accompanying the increase in the engine speed NE, fuel supply of an amount according to a fuel gradual addition coefficient when starting KSTIJ described later is started after a fuel gradual addition delay time when starting TMKSTDLY described later has passed from a point in time when an intake pipe pressure PB reaches to a predetermined negative pressure which permits restart of the fuel supply.

Here, the FI/AT/MGECU 36 sets the fuel gradual addition delay time when starting TMKSTDLY according to the engine water temperature TW, the state of charge SOC of the battery 3, and the vehicle speed VP so that for example in the case where the vehicle speed VP is relatively low or the state of charge SOC is relatively high, the fuel gradual addition delay time when starting TMKSTDLY is set to increase, so as to delay the start timing of the fuel supply, and in the case where traveling drive is required within a predetermined driving force range in this delay period, the vehicle travels under the driving force of the motor M.

Hereunder is a description of addition processing of the fuel gradual addition coefficient when starting KSTIJ which is the coefficient for gradually increasing the fuel supply amount when starting the internal-combustion engine E such as when F/C resetting, with reference to the flowcharts.

Figure 3:
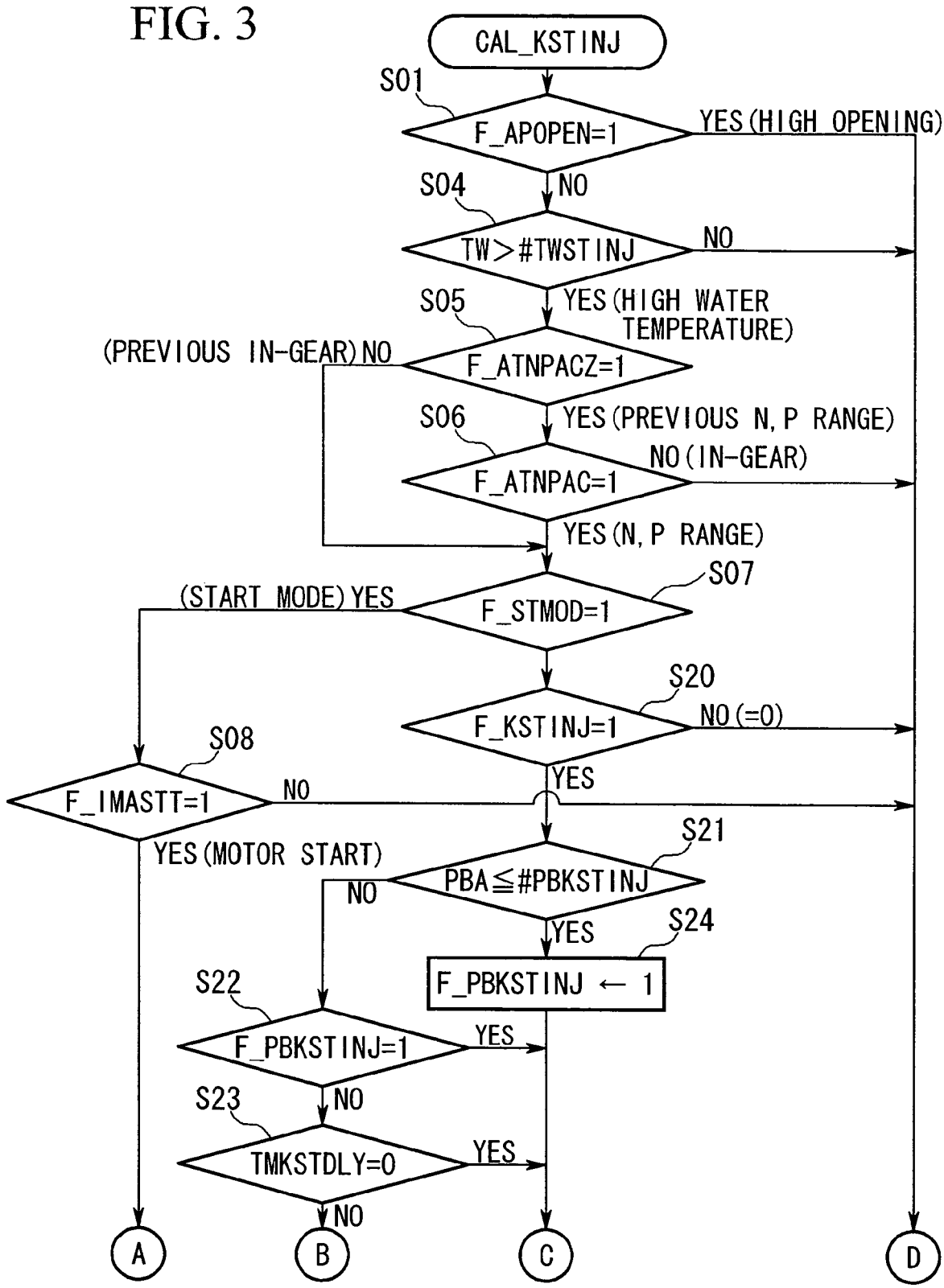
FIG. 3 is a flowchart showing the operation of the control apparatus for a hybrid vehicle shown in FIG. 1.

Firstly in step SOI shown in FIG. 3, it is determined whether the flag value of a high accelerator pedal opening flag F_APOPEN which shows that the accelerator pedal opening AP related to the accelerator operation amount of the driver is a relatively high opening, is "1" or not.

Figure 5:
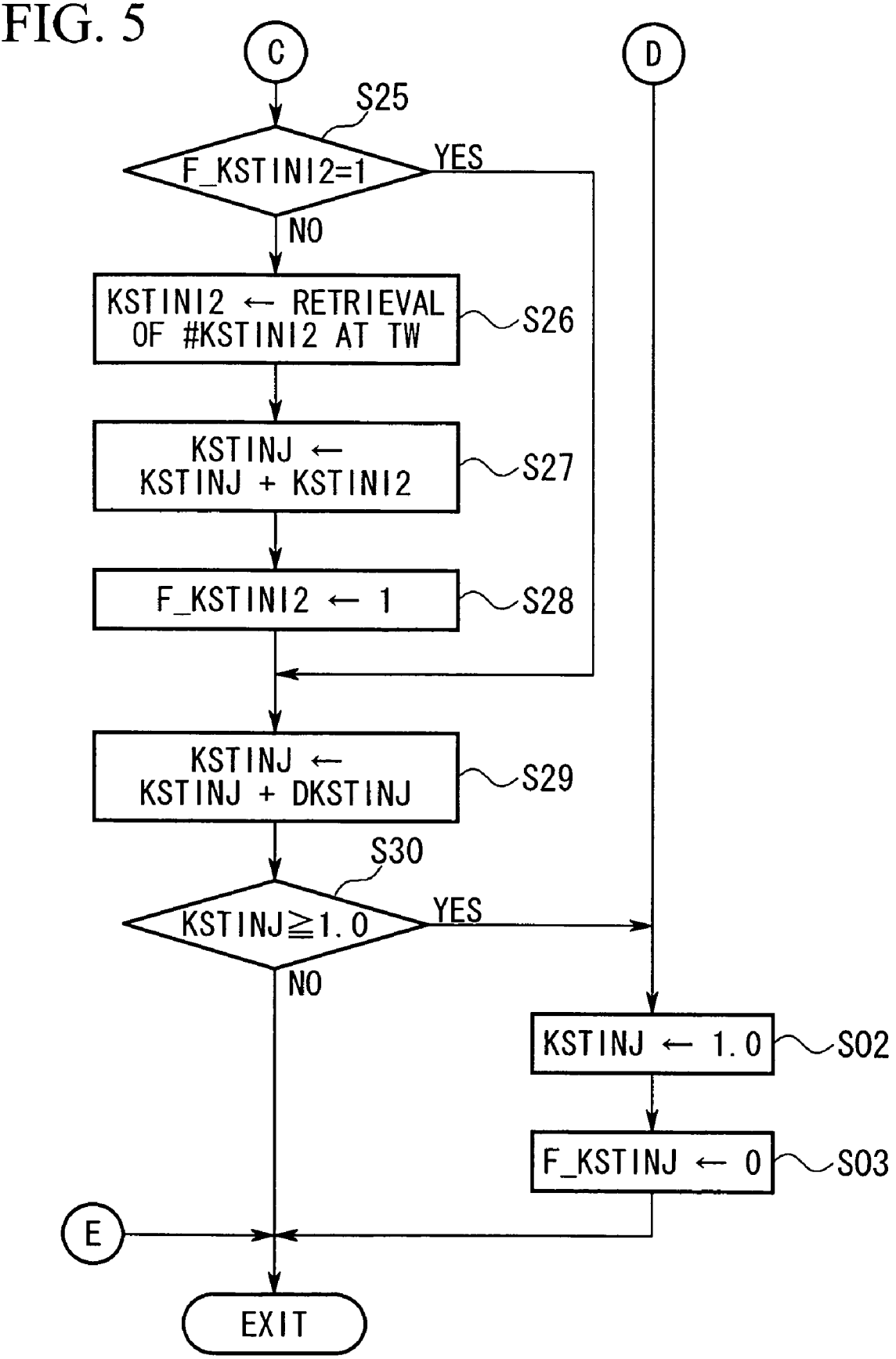
FIG. 5 is a flowchart showing the operation of the control apparatus for a hybrid vehicle shown in FIG. 1.

If this determination is "YES", the flow proceeds to step S02 shown in FIG. 5, where a maximum value 1.0 is set to the fuel gradual addition coefficient when starting KSTIJ, and the flow proceeds to step S03 where a zero is set to the flag value of the fuel gradual addition when starting flag F_KSTINJ which permits execution of the addition processing of the fuel gradual addition coefficient when starting KSTIJ, that is the processing which gradually increases the fuel supply amount according to the fuel gradual addition delay time when starting TMKSTDLY, and the series of processing is terminated.

On the other hand, if this determination is "NO", the flow proceeds to step S04.

In step S04, it is determined whether the engine water temperature TW is higher than a predetermined value #TWSTINJ or not.

If this determination is "NO", the flow proceeds to step S02 described above.

On the other hand, if this determination is "YES", the flow proceeds to step S05.

In step S05, it is determined whether the flag value of a neutral position determination flag F_ATNPACZ in the previous processing is "1" or not.

If the determination in step S05 is "NO" (in-gear), the flow proceeds to step S07 described later.

On the other hand, if the determination in step S05 is "YES" (neutral position or parking position), the flow proceeds to step S06.

In step S06, it is determined whether the flag value of a neutral position determination flag F_ATNPAC in the present processing is "1" or not.

If the determination in step S06 is "NO" (in-gear), the flow proceeds to step S02 described above.

On the other hand, if the determination in step S06 is "YES" (neutral position or parking position), the flow proceeds to step S07.

In step S07, it is determined whether the flag value of a start mode flag F_STMOD which shows the start mode is "1" or not.

If this determination is "NO", the flow proceeds to step S20 described later.

On the other hand, if this determination is "YES", the flow proceeds to step S08.

In step S08, it is determined whether a "1" is set to the flag value of a motor start permission flag F_IMASTT which permits starting of the internal-combustion engine E by the motor M, or not.

If the determination in step S08 is "NO", the flow proceeds to step S02 described above.

Figure 4:
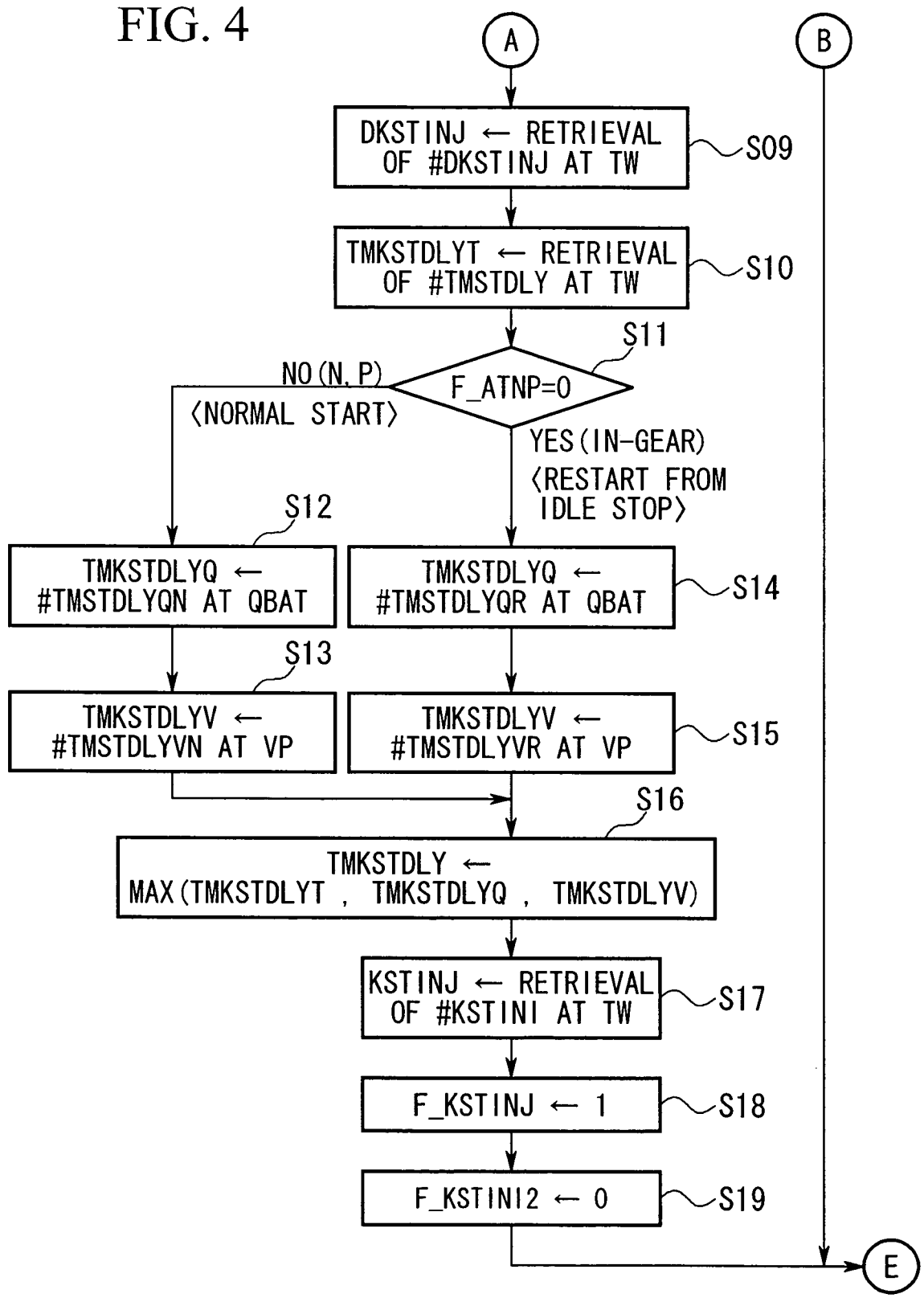
FIG. 4 is a flowchart showing the operation of the control apparatus for a hybrid vehicle shown in FIG. 1.

On the other hand, if the determination in step S08 is "YES", the flow proceeds to step S09 shown in FIG. 4.

Figure 6:
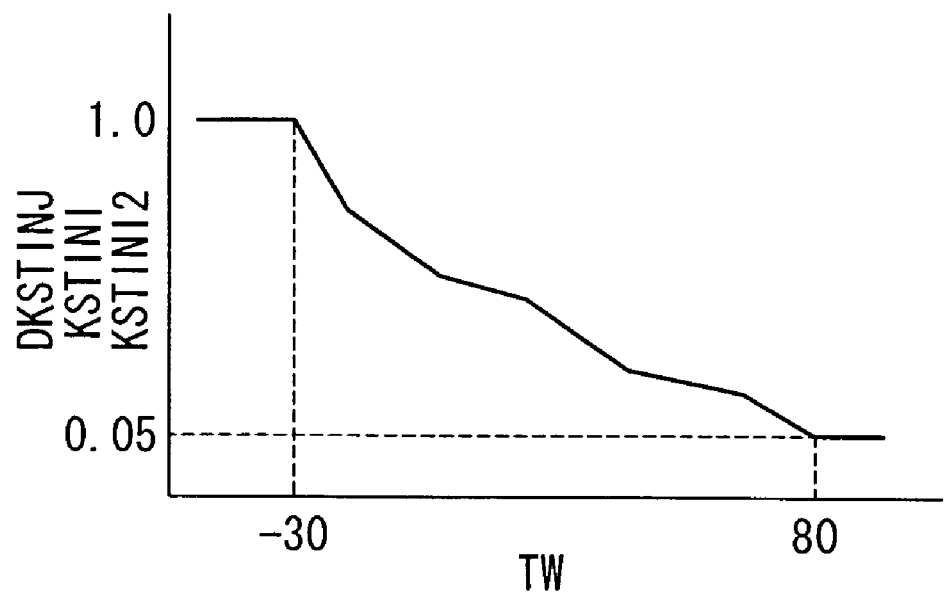
FIG. 6 is a graph showing a gradual addition item #DKSTIN, a fuel gradual addition coefficient when starting initial value #KSTINI, and an addition initial value #KSTINI2 which varies according to engine water temperature TW.

Next, in step S09, for example as shown in FIG. 6, a table of a gradual addition item #DKSTINJ which changes in a decreasing trend with an increase in the engine water temperature TW, is retrieved so as to set a gradual addition item DKSTINJ.

Figure 7:
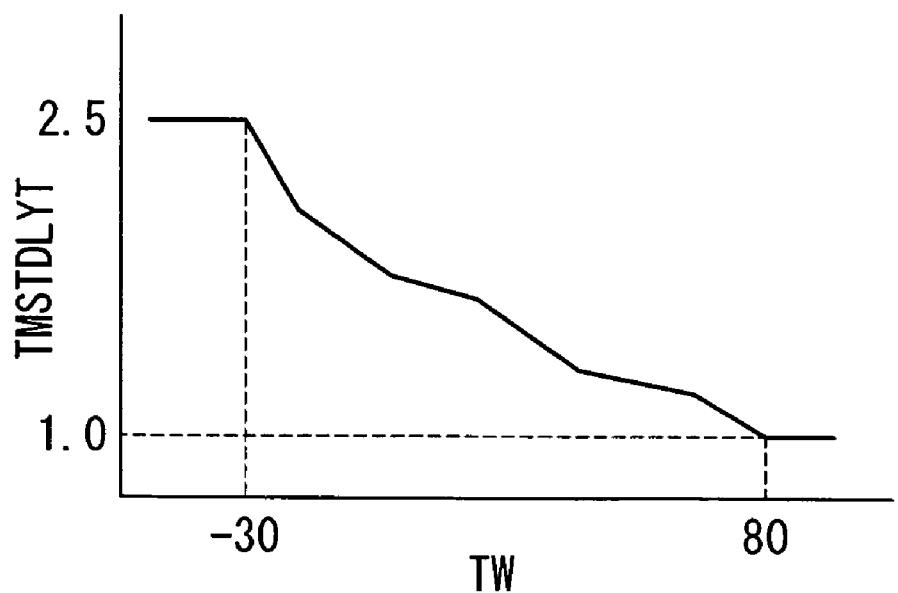
FIG. 7 is a graph showing a fuel gradual addition delay time (engine water temperature) #TMSTDLYT which varies according to the engine water temperature TW.

Next, in step S110, for example as shown in FIG. 7, a table of a fuel gradual addition delay time (engine water temperature) #TMSTDLYT which changes in a decreasing trend with an increase in the engine water temperature TW, is retrieved so as to set a fuel gradual addition delay time when starting (engine water temperature) TMKSTDLYT.

Next, in step S11, it is determined whether the flag value of the neutral position determination flag F_ATNP is "0" or not.

If the determination in step S11 is "YES" (in-gear), that is in the case of restarting from an idle stopped state of the internal-combustion engine E, the flow proceeds to step S14 described later.

On the other hand, if the determination in step S11 is "NO" (neutral position or parking position), that is in the case of normal starting of the internal-combustion engine E, the flow proceeds to step S112.

Figure 8:
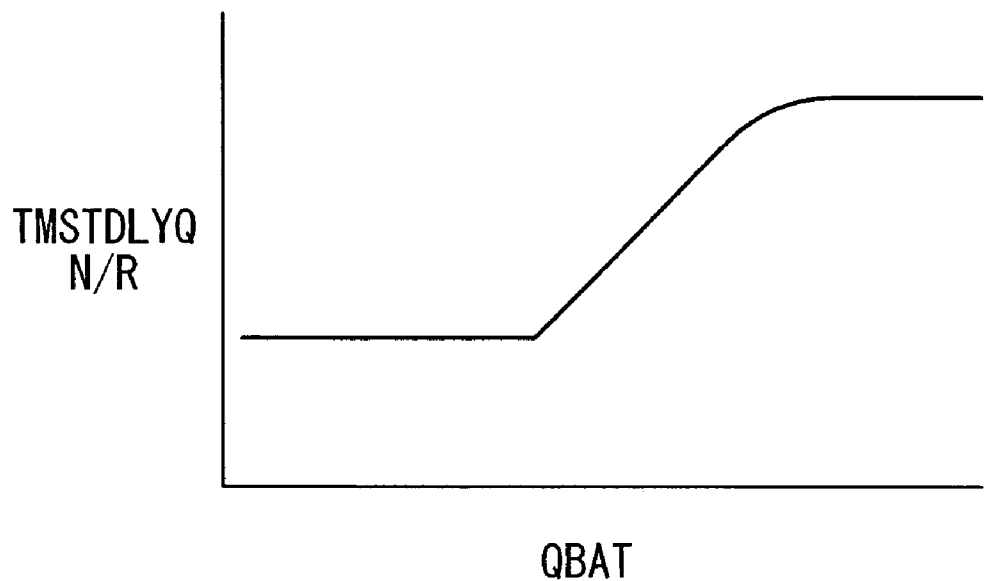
FIG. 8 is a graph showing a fuel gradual addition delay time when normal starting/restarting (state of charge) #TMSTDLYQN/R which varies according to the state of charge QBAT of a battery.

In step S12, for example as shown in FIG. 8, a table of a fuel gradual addition delay time when normal starting (state of charge) #TMSTDLYQN which changes in an increasing trend with an increase in the state of charge QBAT of the battery 3 is retrieved so as to set a fuel gradual addition delay time when starting (state of charge) TMKSTDLYQ.

Figure 9:
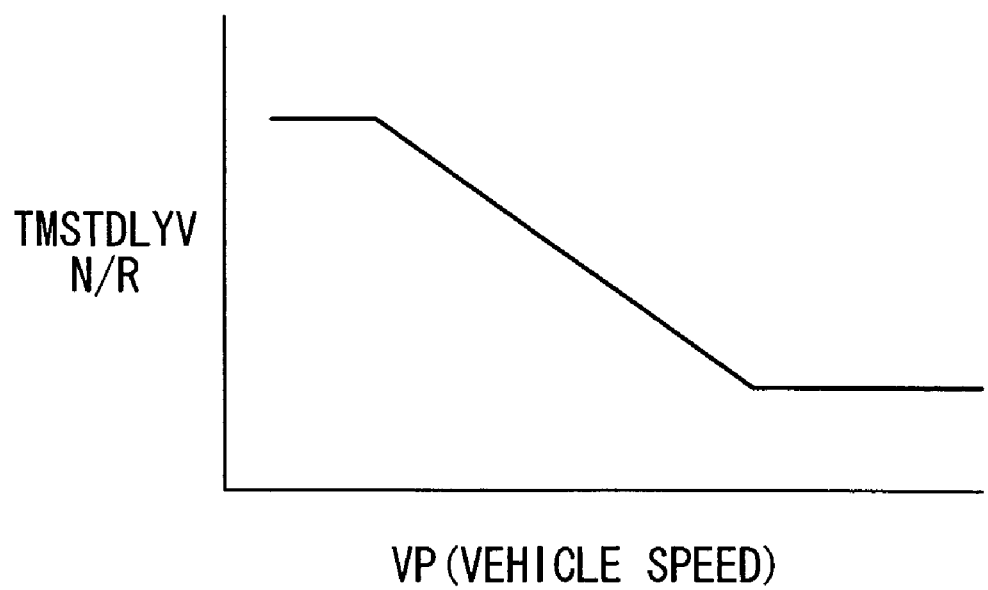
FIG. 9 is a graph showing a fuel gradual addition delay time when normal starting/restarting (vehicle speed) #TMSTDLYVN/R which varies according to vehicle speed VP.

Next, in step S13, for example as shown in FIG. 9, a table of a fuel gradual addition delay time when normal starting (vehicle speed) #TMSTDLYVN which changes in a decreasing trend with the increase in the vehicle speed VP is retrieved so as to set a fuel gradual addition delay time when starting (vehicle speed) TMKSTDLYV, and the flow proceeds to step S16 described later.

In step S14, for example as shown in FIG. 8, a table of a fuel gradual addition delay time when re-starting (state of charge) #TMSTDLYQR which changes in an increasing trend with an increase in the state of charge QBAT of the battery 3 is retrieved so as to set a fuel gradual addition delay time when starting (state of charge) TMKSTDLYQ.

Next, in step S15, for example as shown in FIG. 9, a table of a fuel gradual addition delay time when re-starting (vehicle speed) #TMSTDLYVR which changes in a decreasing trend with an increase in the vehicle speed VP is retrieved so as to set a fuel gradual addition delay time when starting (vehicle speed) TMKSTDLYV, and the flow proceeds to step S16.

In step S16, the greatest value of the fuel gradual addition delay time when starting (engine water temperature) TMKSTDLYT, the fuel gradual addition delay time when starting (state of charge) TMKSTDLYQ, and the fuel gradual addition delay time when starting (vehicle speed) TMKSTDLYV, is set as the fuel gradual addition delay time when starting TMKSTDLY.

Next, in step S17, for example as shown in FIG. 6, a table of a fuel gradual addition coefficient when starting initial value #KSTINI which changes in a decreasing trend with an increase in engine water temperature TW is retrieved so as to set a fuel gradual addition coefficient when starting KSTIJ.

Next, in step S18, a "1" is set to the flag value of the fuel gradual addition flag when starting F_KSTINJ.

Moreover, in step S119, a "1" is set to the flag value of a KSTINI2 addition completion flag F_KSTINI2 which shows that the addition initial value KSTINI2 has been added to the fuel gradual addition coefficient when starting KSTIJ, and the series of processing is terminated.

In step S20 shown in FIG. 6, it is determined whether the flag value of the fuel gradual addition when starting flag F_KSTINJ is "1" or not.

If this determination is "NO", the flow proceeds to step S02 described above.

On the other hand, if this determination is "YES", the flow proceeds to step S21.

In step S21, it is determined whether the present value PBA of the intake pipe pressure PB is less than a predetermined negative pressure capable of fuel supply #PBKSTINJ or not.

If the determination in step S21 is "YES", that is, in the case where the predetermined negative pressure capable of fuel supply #PBKSTINJ is maintained as the intake pipe pressure PB by the driving force of the motor M, the flow proceeds to step S25 described later.

On the other hand, if the determination in step S21 is "NO", the flow proceeds to step S22.

In step S22, it is determined whether the flag value of a fuel gradual addition PB permission when starting flag F_PBKTINJ which permits execution of the gradual adding processing with respect to the fuel gradual addition coefficient when starting KSTIJ according to the intake pipe pressure PB, is "1" or not.

If the determination in step S22 is "YES", the flow proceeds to step S25 described later.

On the other hand, if the determination in step S22 is "NO", that is in an initial state or a stalling state of the internal-combustion engine E, the flow proceeds to step S23.

In step S23, it is determined whether the fuel gradual addition delay time when starting TMKSTDLY is zero or not.

If this determination is "YES", the flow proceeds to step S25 described later.

On the other hand, if this determination is "NO", the series of processing is terminated.

In step S25 shown in FIG. 5, it is determined whether the flag value of the KSTINI2 addition completion flag F_KSTINI2 which shows that the addition initial value KSTINI2 has been added to fuel gradual addition coefficient when starting KSTIJ, is "1" or not.

If this determination is "YES", the flow proceeds to step S29 described later.

On the other hand, if this determination is "NO", the flow proceeds to step S26.

In step S26, for example as shown in FIG. 6, a table of an addition initial value #KSTINI2 which changes in a decreasing trend with an increase in engine water temperature TW is retrieved so as to set the addition initial value KSTINI2.

Next, in step S27, a value obtained by adding to the fuel gradual addition coefficient when starting KSTIJ, the addition initial value KSTINI2 is newly set to the fuel gradual addition coefficient when starting KSTIJ.

Next, in step S28, a "1" is set to the flag value of the KSTINI2 addition completion flag F_KSTINI2.

Next, in step S29, a value obtained by adding to the fuel gradual addition coefficient when starting KSTIJ, the gradual addition item DKSTINJ, is newly set to the fuel gradual addition coefficient when starting KSTIJ.

Next, in step S30, it is determined whether the fuel gradual addition coefficient when starting KSTI is greater than or equal to 1.0 or not.

If this determination is "NO", the series of processing is terminated.

On the other hand, if this determination is "YES", the flow proceeds to step S02 described above.

As described above, according to a control apparatus for a hybrid vehicle of the present embodiment, by setting the timing to start the fuel supply when restarting the internal-combustion engine E according to the engine water temperature TW, the state of charge SOC of the battery 3, and the vehicle speed VP, then for example it is possible to keep the internal-combustion engine E from being restarted with an excessive frequency, and it becomes possible to improve the fuel consumption efficiency while maintaining the desired driving force by the motor M.

Moreover, in the case where the accelerator pedal opening AP related to the accelerator operation amount of the driver is a relatively high opening, then by not executing the processing to gradually increase the fuel supply amount, but immediately setting the fuel supply amount to the maximum value, it is possible to precisely reflect the driver's intention with respect to the traveling behavior of the vehicle.

As described above, according to the control apparatus for a hybrid vehicle of the present invention, by setting the timing to start the fuel supply based on the travelling state of the vehicle and the state of charge of the power storage unit, at the time of restarting the internal-combustion engine when fuel supply is restarted from the execution state of the fuel cut where the fuel supply to the internal-combustion engine is temporarily canceled, it is possible to keep fuel supply from being restarted with excessive frequency by delaying the timing to start the fuel supply in the case where the vehicle can be driven to travel under the driving force of the motor, and it becomes possible to improve the fuel consumption efficiency while maintaining the desired driving force.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for a hybrid vehicle which includes an internal-combustion engine and a motor as a power source, and a power storage unit which transfers electric energy between it and the motor, and connects at least one of said internal-combustion engine and said motor to driving wheels of the vehicle through a transmission so as to transmit a driving force to said driving wheels, comprising:

a fuel supply canceling device which automatically cancels fuel supply to said internal-combustion engine according to an operating state of the vehicle;

a starting state determining device which determines, when starting said internal-combustion engine, whether or not it is restart of said internal-combustion engine in which fuel supply is restarted from a fuel supply canceling state by said fuel supply canceling device; and a fuel supply start timing setting device which sets a timing to start fuel supply to said internal-combustion engine based on a determination by said starting state determining device, a traveling state of the vehicle, and a state of charge of said power storage unit.

2. A control apparatus for a hybrid vehicle according to claim 1, wherein said fuel supply start timing setting device sets the timing to start fuel supply to said internal-combustion engine based on an engine water temperature, the determination by said starting state determining device, the state of charge of said power storage unit, and a vehicle speed.

3. A control apparatus for a hybrid vehicle according to claim 2, wherein fuel supply delay times are set based respectively on the engine water temperature, the state of charge of said power storage unit, and the vehicle speed, and the greatest value of the fuel supply delay times is set as the timing to start fuel supply to said internal-combustion engine.

4. A control apparatus for a hybrid vehicle according to claim 3, further comprising tables of fuel supply delay times based respectively on the engine water temperature, the state of charge of said power storage unit, and the vehicle speed, wherein the tables of fuel supply delay times are retrieved to set the fuel supply delay times based on the engine water temperature, the state of charge of said power storage unit, and the vehicle speed.

5. A control apparatus for a hybrid vehicle according to 4, wherein different tables of fuel supply delay times are used for setting the fuel supply delay times based on the state of charge of said power storage unit, and the vehicle speed, depending on the determination by said starting state determining device.

* * * * *